(12) United States Patent
Yamamoto

(10) Patent No.: US 11,675,875 B2
(45) Date of Patent: Jun. 13, 2023

(54) IMAGE PROCESSING APPARATUS, CAMERA, MOBILE BODY, AND IMAGE PROCESSING METHOD

(71) Applicant: KYOCERA Corporation, Kyoto (JP)

(72) Inventor: Kenji Yamamoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/288,730

(22) PCT Filed: Oct. 1, 2019

(86) PCT No.: PCT/JP2019/038806
§ 371 (c)(1),
(2) Date: Apr. 26, 2021

(87) PCT Pub. No.: WO2020/090330
PCT Pub. Date: May 7, 2020

(65) Prior Publication Data
US 2021/0397879 A1    Dec. 23, 2021

(30) Foreign Application Priority Data

Oct. 29, 2018   (JP) ............................. JP2018-203193

(51) Int. Cl.
| | | |
|---|---|---|
| *G06K 9/62* | (2022.01) | |
| *G06V 20/56* | (2022.01) | |
| *B60R 11/04* | (2006.01) | |
| *H04N 5/232* | (2006.01) | |
| *H04N 7/18* | (2006.01) | |

(52) U.S. Cl.
CPC ............ *G06K 9/623* (2013.01); *B60R 11/04* (2013.01); *G06V 20/56* (2022.01); *H04N 5/23229* (2013.01); *H04N 7/18* (2013.01)

(58) Field of Classification Search
None
See application file for complete search history.

(56) References Cited

U.S. PATENT DOCUMENTS

| | | | | |
|---|---|---|---|---|
| 5,245,675 A | * | 9/1993 | Ferre ........................ | G06K 9/52 |
| | | | | 382/159 |
| 2005/0086185 A1 | | 4/2005 | Achlioptas et al. | |
| 2018/0293758 A1 | * | 10/2018 | Bar-On ................ | H04N 19/436 |
| 2019/0035058 A1 | * | 1/2019 | Strobel .................... | G06T 5/10 |

(Continued)

FOREIGN PATENT DOCUMENTS

JP    2015-073191 A    4/2015

OTHER PUBLICATIONS

Shijila et al., "Moving object detection by low rank approximation and l1-TV regularization on RPCA framework", Sep. 19, 2018, J. Vis. Commun. Image, R. 56 (2018), 188-200. (Year: 2018).*

(Continued)

*Primary Examiner* — James M Anderson, II
(74) *Attorney, Agent, or Firm* — Studebaker & Brackett PC

(57) ABSTRACT

An image processing apparatus 10 includes an interface 12 configured to acquire an image and a processor 13 configured to perform low-rank approximation by singular value decomposition on the acquired image, and perform object recognition on the acquired image subjected to the low-rank approximation by the singular value decomposition.

8 Claims, 17 Drawing Sheets
(14 of 17 Drawing Sheet(s) Filed in Color)

(56) References Cited

U.S. PATENT DOCUMENTS

2019/0087729 A1* 3/2019 Byun ..................... G06N 3/04
2019/0099162 A1* 4/2019 Keshet ................ G06T 7/0016

OTHER PUBLICATIONS

Shijila B. et al., "Moving object detection by low rank approximation and l1-TV regularization on RPCA framework", Journal of Visual Communication and Image Representation, Sep. 19, 2018, pp. 188-200, vol. 56, XP085523636, ISSN 1047-3203, Academic Press, Inc.

* cited by examiner

FIG. 3A
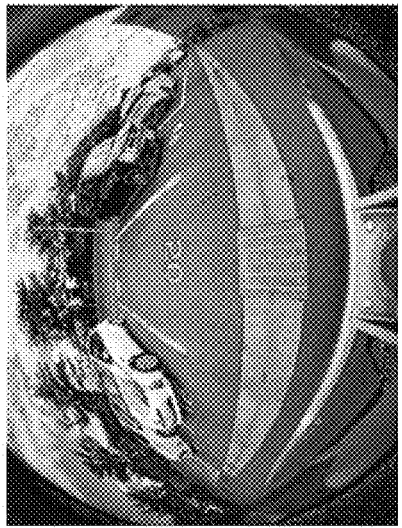
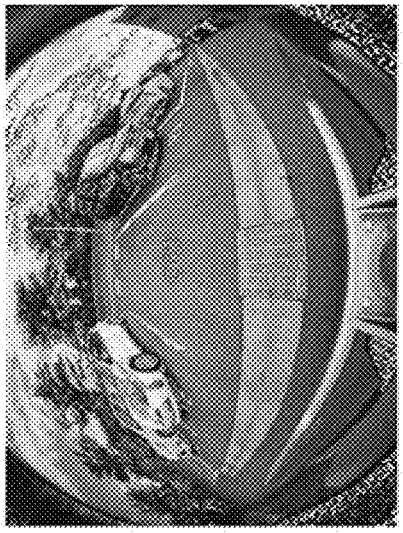
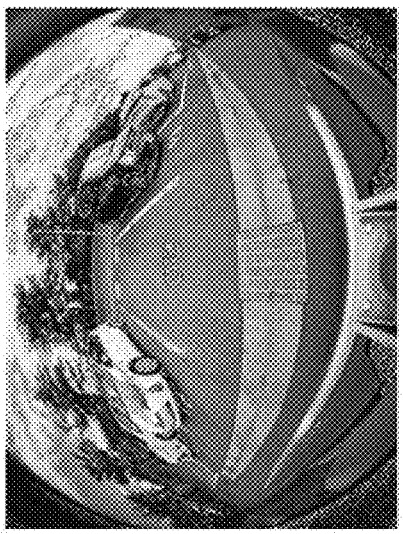

FIG. 3B
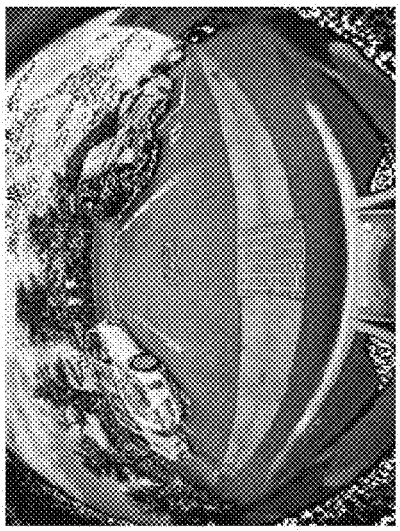
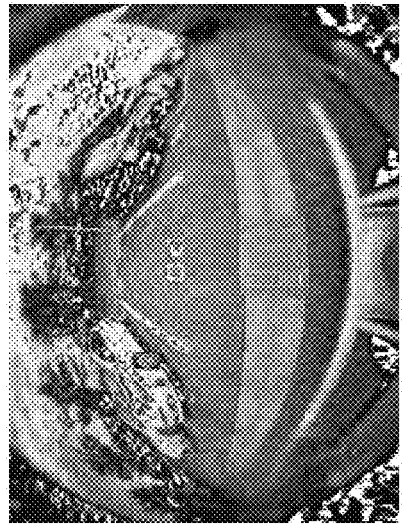
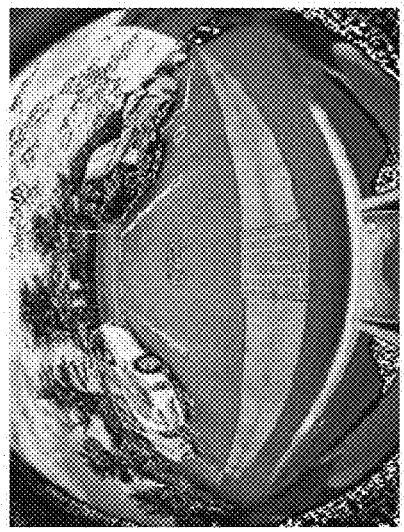
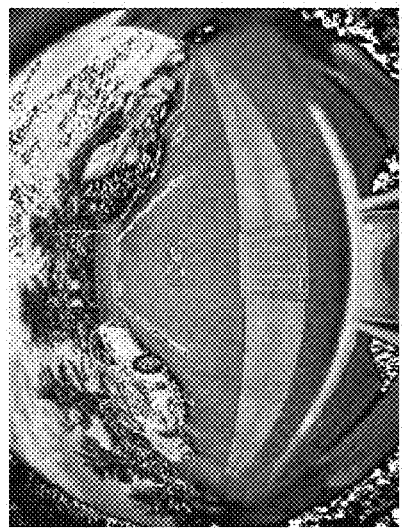

FIG. 4A
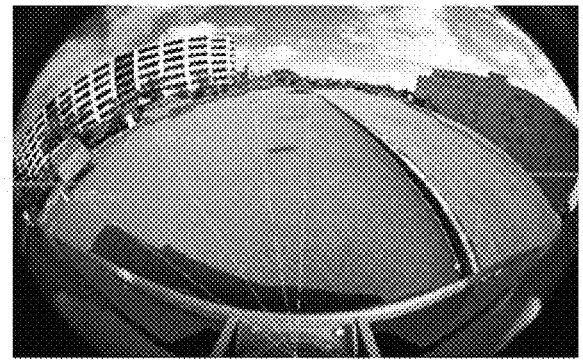
ORIGINAL
WIDTH DIRECTION:Rank=1280
HEIGHT DIRECTION:Rank=960
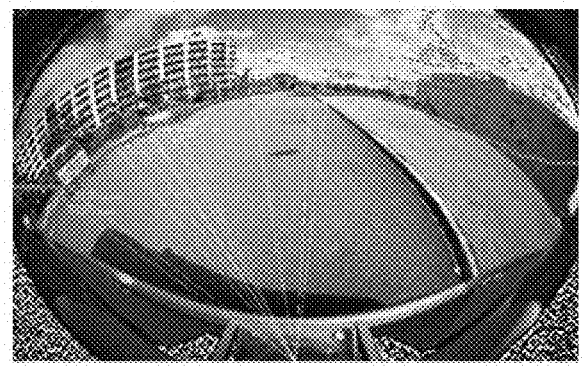
COMPRESSION RATIO:80%
WIDTH DIRECTION:Rank=181
HEIGHT DIRECTION:Rank=163

FIG. 4B
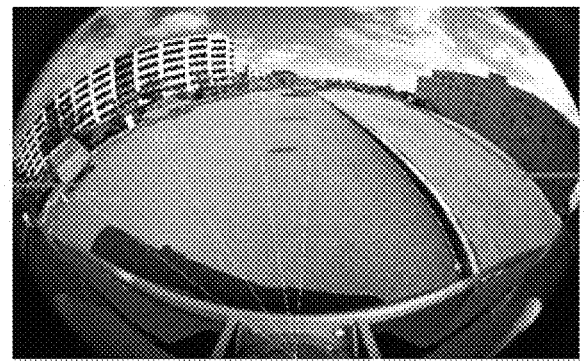
ORIGINAL
WIDTH DIRECTION:Rank=1280
HEIGHT DIRECTION:Rank=960
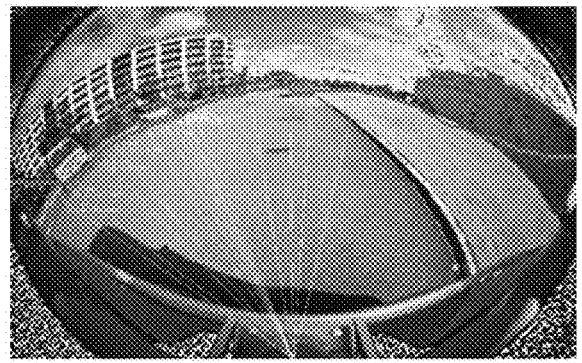
COMPRESSION RATIO:80%
WIDTH DIRECTION:Rank=180
HEIGHT DIRECTION:Rank=162

FIG. 4C
ORIGINAL
WIDTH DIRECTION:Rank=1280
HEIGHT DIRECTION:Rank=960
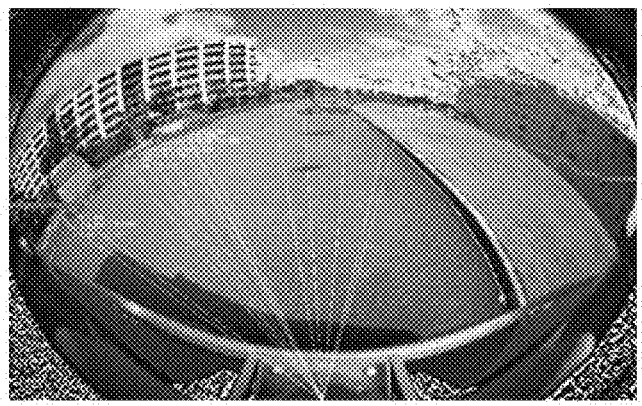
COMPRESSION RATIO:80%
WIDTH DIRECTION:Rank=179
HEIGHT DIRECTION:Rank=161

FIG. 4D
ORIGINAL
WIDTH DIRECTION:Rank=1280
HEIGHT DIRECTION:Rank=960
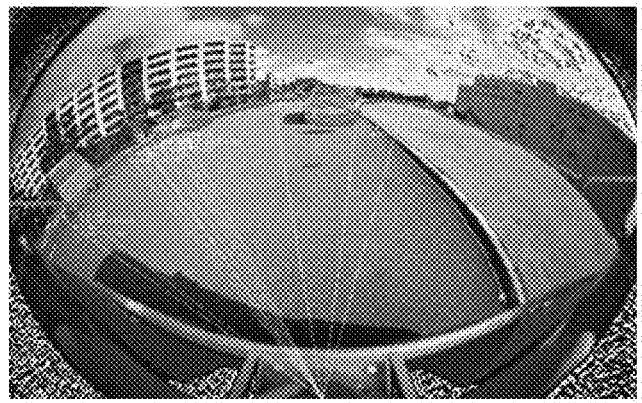
COMPRESSION RATIO:80%
WIDTH DIRECTION:Rank=178
HEIGHT DIRECTION:Rank=159

FIG. 4E
ORIGINAL
WIDTH DIRECTION:Rank=1280
HEIGHT DIRECTION:Rank=960
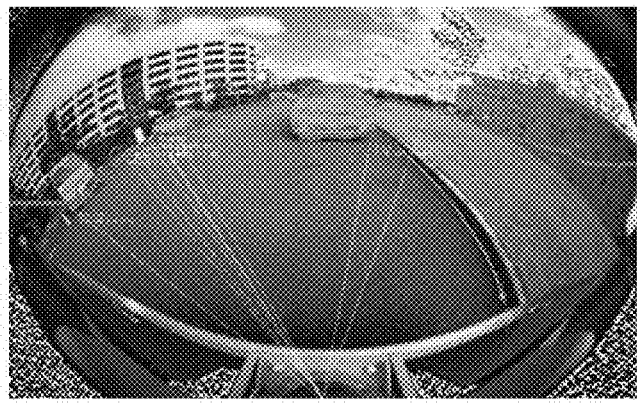
COMPRESSION RATIO:80%
WIDTH DIRECTION:Rank=175
HEIGHT DIRECTION:Rank=157

FIG. 4F
ORIGINAL
WIDTH DIRECTION:Rank=1280
HEIGHT DIRECTION:Rank=960
COMPRESSION RATIO:80%
WIDTH DIRECTION:Rank=174
HEIGHT DIRECTION:Rank=158

FIG. 5A
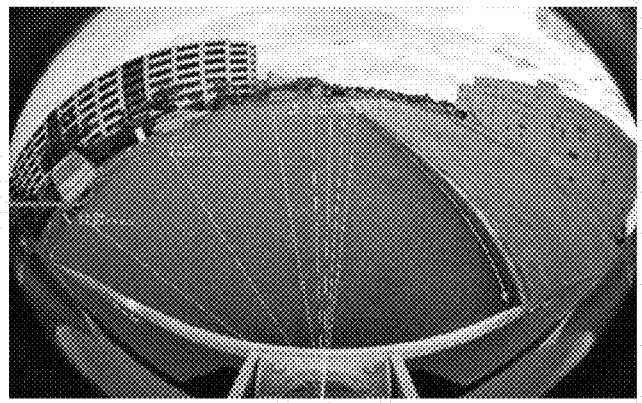
ORIGINAL
WIDTH DIRECTION:Rank=1280
HEIGHT DIRECTION:Rank=960
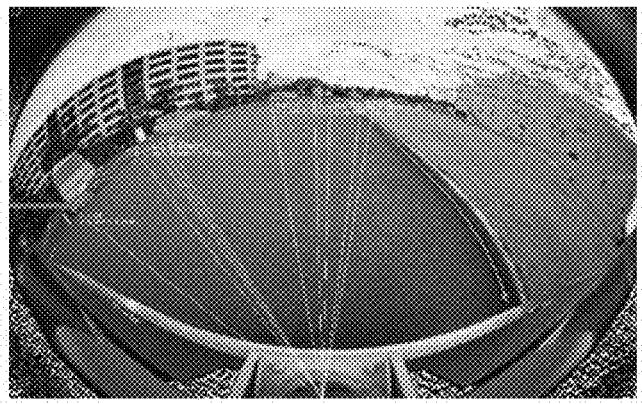
COMPRESSION RATIO:80%
WIDTH DIRECTION:Rank=187
HEIGHT DIRECTION:Rank=168

FIG. 5B
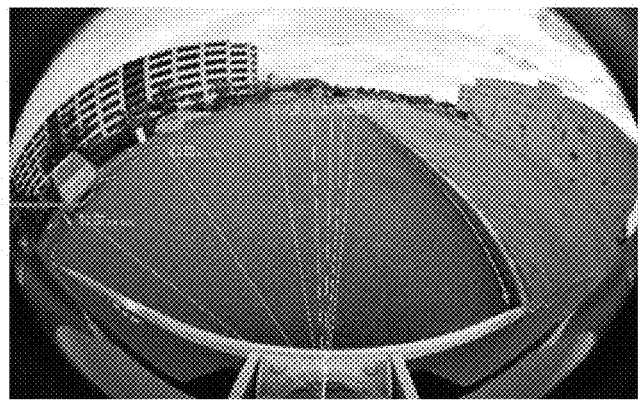
ORIGINAL
WIDTH DIRECTION:Rank=1280
HEIGHT DIRECTION:Rank=960
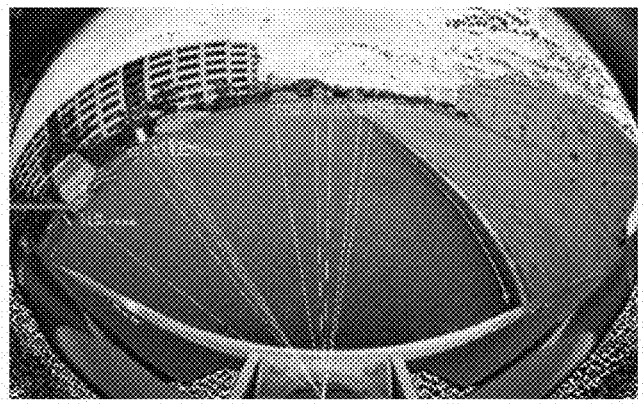
COMPRESSION RATIO:80%
WIDTH DIRECTION:Rank=185
HEIGHT DIRECTION:Rank=167

FIG. 5C
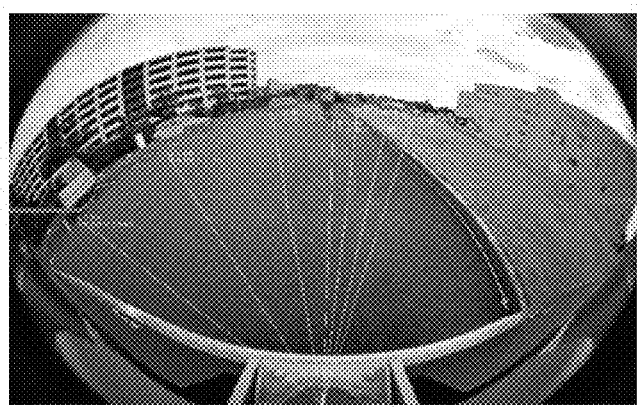
ORIGINAL
WIDTH DIRECTION:Rank=1280
HEIGHT DIRECTION:Rank=960
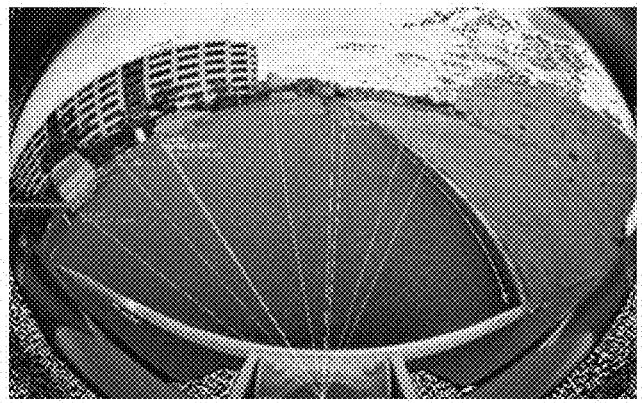
COMPRESSION RATIO:80%
WIDTH DIRECTION:Rank=185
HEIGHT DIRECTION:Rank=167

FIG. 5D
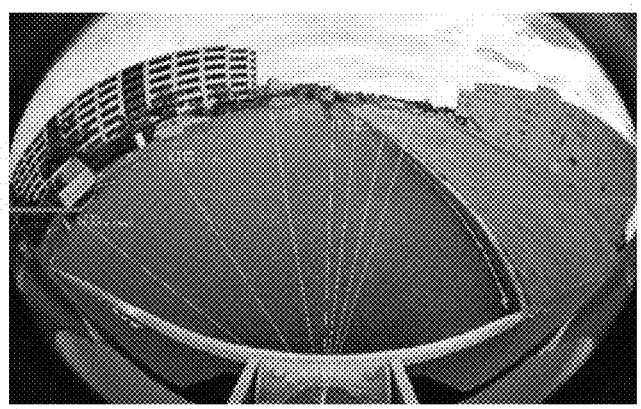
ORIGINAL
WIDTH DIRECTION:Rank=1280
HEIGHT DIRECTION:Rank=960
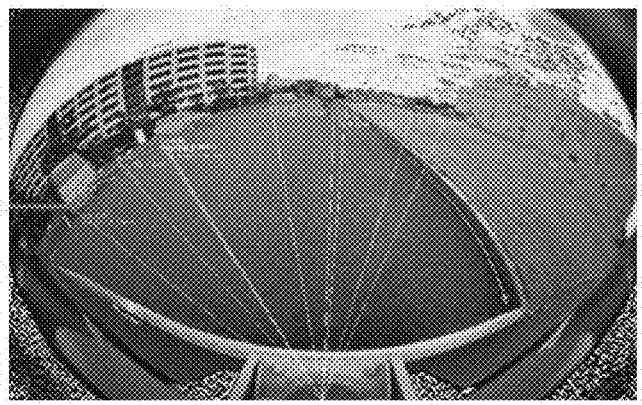
COMPRESSION RATIO:80%
WIDTH DIRECTION:Rank=183
HEIGHT DIRECTION:Rank=164

FIG. 5E
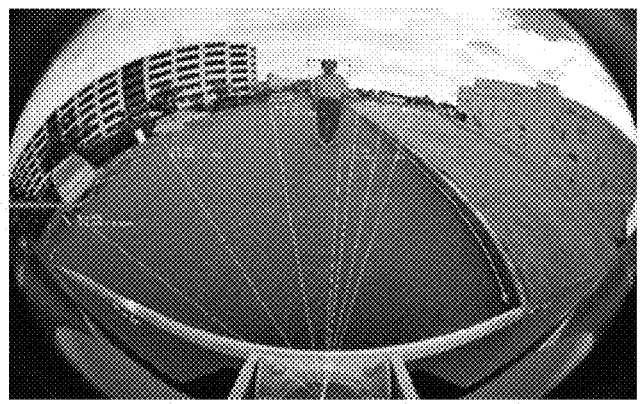
ORIGINAL
WIDTH DIRECTION:Rank=1280
HEIGHT DIRECTION:Rank=960
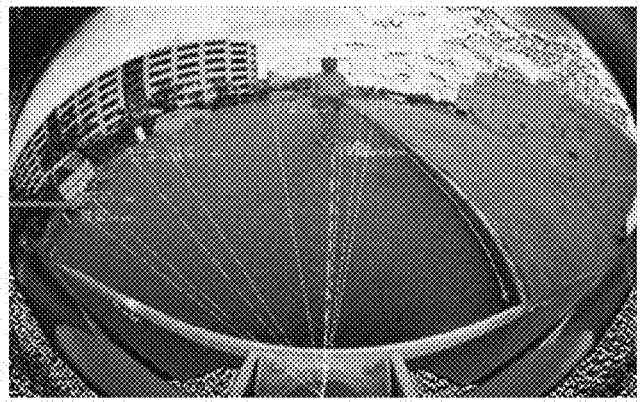
COMPRESSION RATIO:80%
WIDTH DIRECTION:Rank=186
HEIGHT DIRECTION:Rank=167

FIG. 5F
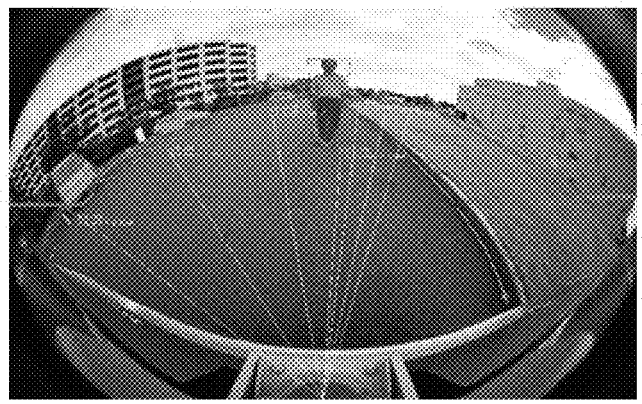
ORIGINAL
WIDTH DIRECTION:Rank=1280
HEIGHT DIRECTION:Rank=960
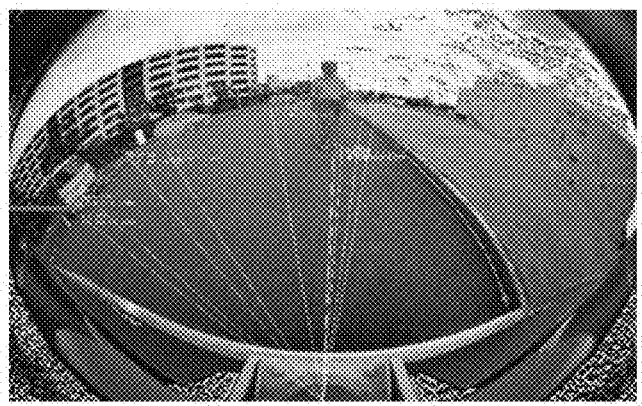
COMPRESSION RATIO:80%
WIDTH DIRECTION:Rank=194
HEIGHT DIRECTION:Rank=174

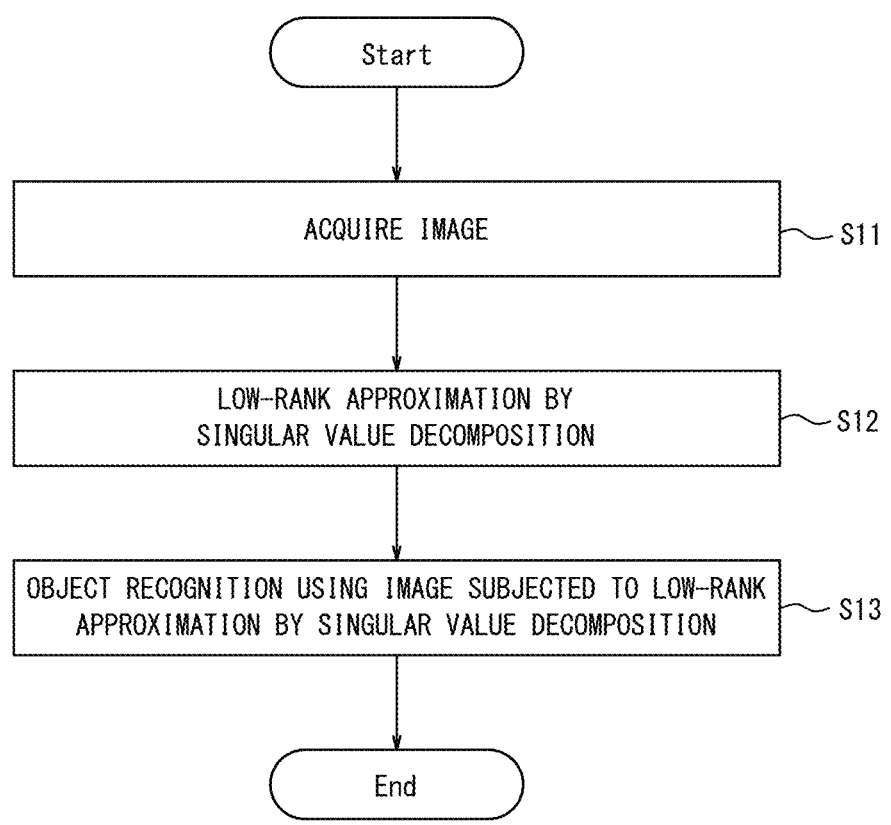

IMAGE PROCESSING APPARATUS, CAMERA, MOBILE BODY, AND IMAGE PROCESSING METHOD

CROSS REFERENCE TO RELATED APPLICATION

This application claims priority to and the benefit of Japanese Patent Application No. 2018-203193 filed on Oct. 29, 2018, the entire contents of which are incorporated herein by reference.

TECHNICAL FIELD

The present disclosure relates to an image processing apparatus, a camera, a mobile body, and an image processing method.

BACKGROUND

A known technique relates to detecting an object of interest from a captured image using a model generated by machine learning.

SUMMARY

An image processing apparatus according to an aspect includes an interface configured to acquire an image and a processor configured to perform low-rank approximation by singular value decomposition on the acquired image, and perform object recognition on the acquired image subjected to the low-rank approximation by the singular value decomposition.

A camera according to an aspect includes an imaging optical system, an image sensor configured to capture an image formed via the imaging optical system, an interface configured to acquire the image captured by the image sensor, and a processor configured to perform low-rank approximation by singular value decomposition on the acquired image, and perform object recognition on the acquired image subjected to the low-rank approximation by the singular value decomposition.

A mobile body according to an aspect includes a camera configured to capture an image of the surroundings of the mobile body, wherein the camera includes an imaging optical system, an image sensor configured to capture an image formed via the imaging optical system, an interface configured to acquire the image captured by the image sensor, and a processor configured to perform low-rank approximation by singular value decomposition on the acquired image, and perform object recognition on the acquired image subjected to the low-rank approximation by the singular value decomposition.

An image processing method according to an aspect is an image processing method of an image processing apparatus, wherein the image processing method includes, acquiring an image and performing low-rank approximation by singular value decomposition on an acquired image, and performing object recognition on the acquired image subjected to the low-rank approximation by the singular value decomposition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the accompanying drawings:

FIG. 3A is a diagram illustrating examples of a captured image and images subjected to low-rank approximation by singular value decomposition;

FIG. 3B is a diagram illustrating examples of a captured image and images subjected to the low-rank approximation by singular value decomposition;

FIG. 4A is a diagram illustrating an example result of object recognition using a captured image and an image subjected to the low-rank approximation by singular value decomposition;

FIG. 4B is a diagram illustrating an example result of the object recognition using a captured image and an image subjected to the low-rank approximation by singular value decomposition;

FIG. 4C is a diagram illustrating an example result of the object recognition using a captured image and an image subjected to the low-rank approximation by singular value decomposition;

FIG. 4D is a diagram illustrating an example result of the object recognition using a captured image and an image subjected to the low-rank approximation by singular value decomposition;

FIG. 4E is a diagram illustrating an example result of the object recognition using a captured image and an image subjected to the low-rank approximation by singular value decomposition;

FIG. 4F is a diagram illustrating an example result of the object recognition using the captured image and an image subjected to the low-rank approximation by singular value decomposition;

FIG. 5A is a diagram illustrating an example result of object recognition using a captured image and an image subjected to the low-rank approximation by singular value decomposition;

FIG. 5B is a diagram illustrating an example result of the object recognition using a captured image and an image subjected to the low-rank approximation by singular value decomposition;

FIG. 5C is a diagram illustrating an example result of the object recognition using a captured image and an image subjected to the low-rank approximation by singular value decomposition;

FIG. 5D is a diagram illustrating an example result of the object recognition using a captured image and an image subjected to the low-rank approximation by singular value decomposition;

FIG. 5E is a diagram illustrating an example result of the object recognition using a captured image and an image subjected to the low-rank approximation by singular value decomposition;

FIG. 5F is a diagram illustrating an example result of the object recognition using a captured image and an image subjected to the low-rank approximation by singular value decomposition; and FIG. 6 is a flowchart for explaining an image processing method of the image processing apparatus illustrated in FIG. 1.

DETAILED DESCRIPTION

Figure 1:
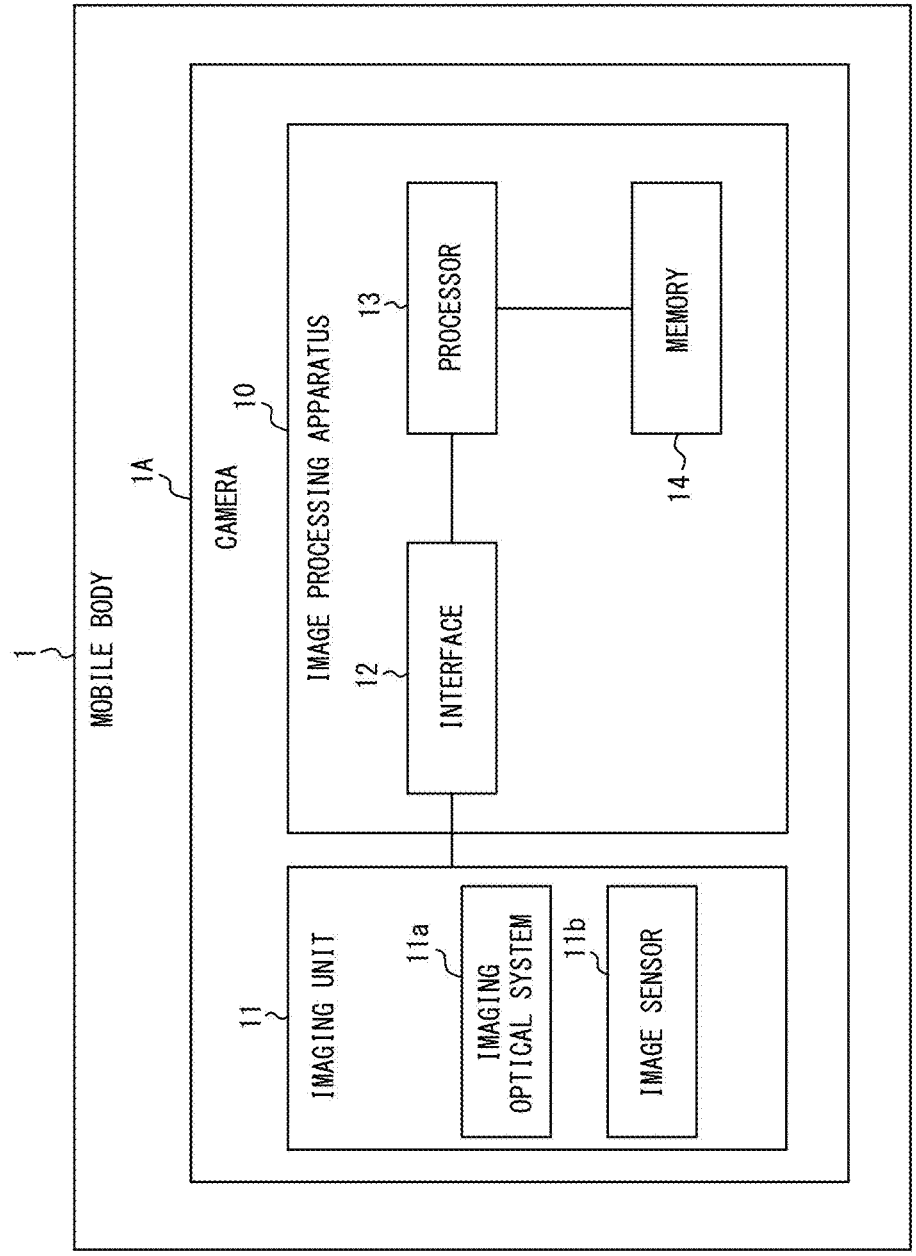
FIG. 1 is a diagram illustrating an example configuration of an image processing apparatus according to an embodiment of the present disclosure.

To perform object recognition of an object included in an image, it is beneficial to reduce a processing load while suppressing a decrease in an accuracy of the object recognition. According to an aspect of the present disclosure, the processing load can be reduced while a decrease in the accuracy of the object recognition is suppressed.

Hereinafter, embodiments of the present disclosure will be described with reference to the drawings. In the drawings, the same reference numerals denote the same or equivalent elements.

FIG. 1 is a diagram illustrating an example configuration of an image processing apparatus 10 according to an embodiment of the present disclosure. The image processing apparatus 10 according to the present embodiment performs object recognition for recognizing an object included in an image. The image processing apparatus 10 is mounted on, for example, a mobile body 1, as illustrated in FIG. 1. In a case in which the image processing apparatus 10 is mounted on the mobile body 1, the image processing apparatus 10 performs the object recognition to recognize an object such as a person, another mobile body, or the like included in an image capturing the surroundings of the mobile body 1. Hereinafter, the image processing apparatus 10 will be described as being mounted on the mobile body 1.

The mobile body 1 according to the present disclosure is, for example, a vehicle. The vehicle may include automobiles and industrial vehicles. Vehicles are not limited thereto but may also include rail vehicles, domestic vehicles, and fixed-wing aircraft that travel on a runway. Automobiles include cars, trucks, buses, motorcycles, and trolley buses. Automobiles are not limited thereto and may also include other automobiles that travel on the road. Industrial vehicles include agricultural vehicles and construction vehicles. Industrial vehicles include, but are not limited to, forklifts and golf carts. Industrial vehicles for agricultural purpose include, but are not limited to, tractors, tillers, transplanters, binders, combined harvesters, and lawn mowers. Industrial vehicles for construction purposes include, but are not limited to, bulldozers, scrapers, excavators, crane trucks, dump trucks, and load rollers. The vehicles may include human-powered vehicles that travel on human power. Classification of the vehicles is not limited to the above. For example, vehicles may include industrial vehicles authorized to travel on the road, and a plurality of categories may include the same type of vehicle.

The image processing apparatus 10 illustrated in FIG. 1 includes an interface 12, a processor 13, and a memory 14. The mobile body 1 is equipped with an imaging unit 11 configured to acquire an image of the surroundings of the mobile body 1. The image processing apparatus 10 and the imaging unit 11 constitute a camera 1A mounted on the mobile body 1. First, the imaging unit 11 will be described.

The imaging unit 11 is a vehicle-mounted camera mounted on the mobile body 1. The imaging unit 11 is configured to acquire an image capturing the surroundings of the mobile body 1. A plurality of imaging units 11 may be mounted on the mobile body 1. For example, in a case in which four vehicle-mounted cameras are mounted on the mobile body 1, the imaging units 11 are respectively arranged at a location where the imaging unit 11 can capture an image of the surroundings on a front side of the mobile body 1 and at least a part of a front side surface of the mobile body 1, a location where the imaging unit 11 can capture an image of the surroundings on a rear side of the mobile body 1 and at least a part of a rear side surface of the mobile body 1, a location where the imaging unit 11 can capture an image of the surroundings on a left side of the mobile body 1 and at least a part of a left surface of the mobile body 1, and a location where the imaging unit 11 can capture an image of the surroundings on a right side of the mobile body 1 and at least a part of a right surface of the mobile body 1. This arrangement enables capturing of the four regions surrounding the mobile body 1.

The imaging unit 11 includes at least an imaging optical system 11a and an image sensor 11b.

The imaging optical system 11a includes one or more optical members such as, for example, a lens and an aperture. The lens included in the imaging optical system 11a may be a lens having a wide angle of view, such as a fisheye lens. The imaging optical system 11a is configured to form a subject image on a light receiving surface of the image sensor 11b. The image sensor 11b includes, for example, a CCD (Charge Coupled Device) image sensor or a CMOS (Complementary Metal-Oxide Semiconductor) image sensor. A plurality of pixels are arranged on the light receiving surface of the image sensor 11b. The image sensor 11b is configured to capture the subject image formed on the light receiving surface and generate an image. The imaging unit 11 may output the captured image to an external device such as an ECU (Electronic Control Unit), a display, a navigation device, or the like mounted on the mobile body 1. Further, the imaging unit 11 may have a function of performing predetermined image processing such as white balance adjustment processing, exposure adjustment processing, and gamma correction processing on the captured image.

Next, a configuration of the image processing apparatus 10 will be described.

The interface 12 communicates with various elements included in the mobile body 1 in a wired or wireless manner. For example, the interface 12 acquires the image captured by the imaging unit 11 and outputs the image to the processor 13.

The processor 13 includes, for example, a specialized processor such as a DSP (Digital Signal Processor), a GPU (Graphics Processing Unit) or an FPGA (Field-Programmable Gate Array), or a general purpose processor such as a CPU (Central Processing Unit). The processor 13 controls an operation of the image processing apparatus 10 as a whole. For example, the processor 13 performs object recognition using an acquired image which is an image acquired by the interface 12. Details of the object recognition performed by the processor 13 will be described later.

The memory 14 includes, for example, a primary storage device or a secondary storage device. The memory 14 stores various information and programs necessary for the operation of the image processing apparatus 10.

Next, the object recognition performed by the processor 13 will be described.

The processor 13 performs mathematical processing on the acquired image acquired by the interface 12, and performs the object recognition on a processed image. In particular, the processor 13 performs low-rank approximation by the singular value decomposition on the acquired image and performs the object recognition on the image subjected to the low-rank approximation.

The processor 13 generates a matrix M corresponding to the acquired image. The matrix M corresponding to the acquired image is a matrix representation of the acquired image. An image normally consists of a plurality of pixels arranged in a row direction and a column direction. The processor 13 generates, for example, a matrix M in which a brightness value of each pixel of the acquired image is an element corresponding to a position of each pixel. Then, the processor 13 performs the singular value decomposition on the matrix M. The singular value decomposition is commonly used mathematical processing that, although detailed description thereof will be omitted, decomposes a matrix M constituting any number of m×n into three matrix elements A, B, and C, as indicated by the following equation (1):

$$M=ABC \qquad \text{equation (1).}$$

In equation (1), A is a left singular value matrix having an orthogonal matrix of m×m, B is a diagonal matrix of m×n, and C is a right singular value matrix having an orthogonal matrix of n×n. The diagonal matrix B (a first diagonal matrix) is a matrix in which a diagonal component is a positive value or 0 and a non-diagonal component is 0. The diagonal components of the diagonal matrix B are arranged in descending order from one with the largest value. Among the diagonal components of the diagonal matrix B, the number of components that is not zero will be referred to as a rank k.

The processor 13 performs the low-rank approximation after performing the singular value decomposition described above. In particular, the processor 13 generates a diagonal matrix B' (a second diagonal matrix) in which a rank of the diagonal matrix B is lowered to k-l. Here, the processor 13 generates the diagonal matrix B' by setting one diagonal component to zero in order from a component having the smallest value, from among the k-number of diagonal components of the diagonal matrix B that are not zero. That is, the processor 13 generates the diagonal matrix B' in which the rank of the diagonal matrix B is lowered. Then, the processor 13 generates an image corresponding to a matrix M' acquired from an inner product of the left singular value matrix A, the diagonal matrix B' in which the rank of the diagonal matrix B is lowered, and the right singular value matrix C, as an image subjected to the low-rank approximation.

Next, the processor 13 performs the object recognition using the image corresponding to the matrix M'. Hereinafter, the image corresponding to the matrix M' calculated based on the acquired image will be referred to as an image subjected to the low-rank approximation by the singular value decomposition.

As described above, the matrix M' after the low-rank approximation by the singular value decomposition is performed is acquired from the inner product of the left singular value matrix A, the diagonal matrix B' in which the rank of the diagonal matrix B is lowered, and the right singular value matrix C. The diagonal matrix B' includes more diagonal components having values of zero than the diagonal matrix B Due to such a sparsity of the diagonal matrix B', the processor 13 can reduce the processing load required for the object recognition. For example, the processor 13 can reduce the processing load by omitting a calculation for an obvious result such as x (any value)×0=0, or x (any value)+0=x.

Further, the diagonal matrix B' is obtained by setting a predetermined number of diagonal components, from among the diagonal components of the diagonal matrix B, to zero in order from a diagonal component having the smallest value. Thus, in the image subjected to the low-rank approximation by the singular value decomposition, a portion of the acquired image that lacks characteristics is preferentially compressed. As a result, characteristic portions necessary for the object recognition remain in the image subjected to the low-rank approximation by singular value decomposition, whereby a decrease in the accuracy of the object recognition is suppressed.

Generally, use of an image having a high resolution is conceived to improve the accuracy of the object recognition. However, use of a high-resolution image increases the processing load and time required for the object recognition. Also, to reduce the processing load of the object recognition, reducing an image resolution can be conceived. However, reducing the image resolution also reduces the resolution of characteristic portions required for the object recognition, whereby the accuracy of the object recognition decreases. On the other hand, because the low-rank approximation by the singular value decomposition is performed in the present embodiment, the processing load can be reduced while a decrease in the accuracy of the object recognition is suppressed.

The processor 13 determines the rank of the diagonal matrix B' according to an characteristics amount of the image required for the object recognition. That is, the processor 13 determines the rank of the diagonal matrix B' according to a desired characteristics amount in the image subjected to the low-rank approximation by the singular value decomposition. For example, the processor 13 acquires the characteristics amount in the image subjected to the low-rank approximation by the singular value decomposition in each rank while changing the rank of the diagonal matrix B' by a predetermined value, and determines the rank of the diagonal matrix B' according to a desired characteristics amount, based on a relationship between the rank of the diagonal matrix B' and the characteristics amount in the image subjected to the low-rank approximation by the value decomposition. Here, the relationship between the rank of the diagonal matrix B' and the characteristics amount in the image subjected to the low-rank approximation by the singular value decomposition varies in each image. Thus, although a calculation is necessary to obtain the relationship between the rank of the diagonal matrix B' and the characteristics amount in the image subjected to the low-rank approximation by the singular value decomposition, the processing load of the processor 13 including this calculation can be less than a processing load of object recognition performed using the acquired image itself. Note that the characteristics amount means an amount of characteristic portions necessary for the object recognition such as an edge of an object and can be expressed using, for example, a spatial frequency.

Further, the processor 13 may determine the desired characteristics amount according to an area of the image.

For example, in an image capturing the front side of a mobile body 1, an object such as the sky having a small influence on progress of the mobile body 1 is often included in an upper portion of the image, and an object such as another mobile body 1 or a pedestrian having a large influence on the progress of the mobile body 1 is often included in a central portion of the image. That is, the upper portion of the image capturing the front side of the mobile body 1 often includes an object that is less significant for the object recognition, and the central portion of the image often includes an object that is highly significant for the object recognition. Further, a lower portion of the image obtained by capturing the front side of the mobile body 1 often includes an object that has been in the central portion of the image whose distance information has been acquired and has relatively approached the mobile body 1 along with the progress of the mobile body 1. As described above, an image includes an area that should be preferentially subjected to the object recognition.

Figure 2:
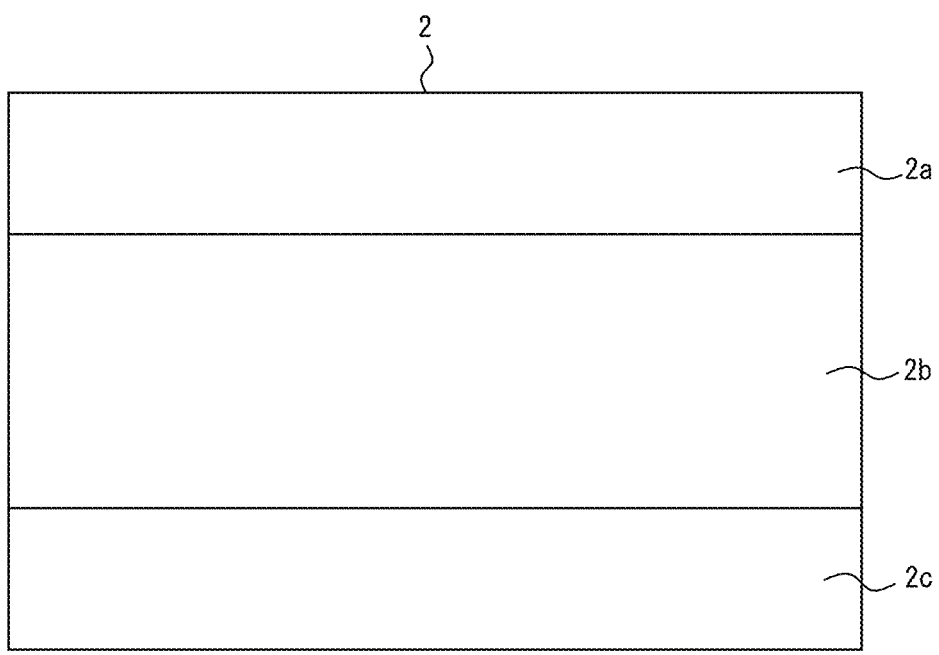
FIG. 2 is a diagram for explaining an example desired characteristic amount determined by a processor illustrated in FIG. 1.

Accordingly, the processor 13 may determine a desired characteristics amount according to an area of the acquired image and determine the rank of the diagonal matrix B' for each area according to the desired characteristics amount. For example, the processor 13 may increase the desired characteristics amount in a central portion 2b of the acquired image 2, reduce desired characteristic in an upper portion 2a of the acquired image 2, and set the desired characteristics amount in a lower portion 2c to a value between the characteristics amount in the upper portion 2a and the characteristics amount in the central portion 2b, as illustrated in FIG. 2.

The processor 13 may determine a desired characteristics amount according to a behavior of the mobile body 1. For example, the processor 13 may increase the desired characteristics amount when the mobile body 1 is progressing at a high speed and reduce the desired characteristics amount when the mobile body 1 is progressing at a low speed.

Further, in a case in which a frame rate at which the imaging unit 11 images is variable, the processor 13 may determine the frame rate and the desired characteristics amount, according to a behavior of the mobile body 1. For example, when the mobile body 1 is progressing at a high speed, it can be said that the mobile body 1 is progressing on a highway. When the mobile body 1 is progressing on the highway, a moving amount of the mobile body 1 per unit time is large, and thus it is desirable that imaging intervals of the imaging unit 11 are not too long. Further, because of the large amount of movement of the mobile body 1 per unit time, it is desired to reduce the time required for the object recognition. Thus, when the mobile body 1 is progressing, for example, on the highway, the processor 13 increases the frame rate of the imaging unit 11 and, simultaneously, reduces the desired characteristics amount.

For example, when the mobile body 1 is progressing at a low speed, it can be said that the mobile body 1 is progressing in an urban area. When the mobile body 1 is progressing in the urban area, the amount of movement of the mobile body 1 per unit time is small. However, there is a high possibility that a pedestrian runs out in front of the mobile body 1, and thus the object recognition is often required to be performed highly accurately. Thus, for example, when the mobile body 1 is progressing at a low speed, the processor 13 reduces the frame rate of the imaging unit 11 and increases the desired characteristics amount. In this way, the processor 13 can perform the object recognition according to a situation in which the mobile body 1 is progressing.

As described above, the processor 13 performs the object recognition using the image subjected to the low-rank approximation by the singular value decomposition. In particular, the processor 13 performs the object recognition by inputting the image subjected to the low-rank approximation by the singular value decomposition to a model generated by learning. The model used for the object recognition is generated by, for example, learning that uses a neural network. For model training, an image that is not subjected to the low-rank approximated by the singular value decomposition can be used.

Next, an actual captured image and an image in which the characteristics amount is compressed by performing the low-rank approximation by the singular value decomposition on the captured image will be illustrated by way of example. Hereinafter, the captured image is assumed to be a color image. An example in which the color image is regarded as a third-order tensor and the color image is subjected to the low-rank approximation by Tucker Decomposition/Higher Order Singular Value Decomposition (HOSVD) will be illustrated. Tucker Decomposition/Higher Order Singular Value Decomposition is a method in which the singular value decomposition in a matrix (a second-order tensor) is extended to a tensor.

FIG. 3A and FIG. 3B are diagrams illustrating an original captured image and images having respective compressed amounts of information obtained by performing the low-rank approximation by the singular value decomposition on the captured image. FIG. 3A illustrates the original captured image and images in which respective compression ratios of the amounts of characteristics are 95%, 90%, and 80%. FIG. 3B illustrates images in which the respective compression ratios of the amounts of characteristics are 75%, 70%, 60%, and 50%. The compression ratio of the characteristics amount is defined by standardizing a singular value (a diagonal component that is not zero) of the diagonal matrix B obtained by performing the singular value decomposition on the matrix corresponding to the captured image.

As illustrated in FIG. 3A and FIG. 3B, the original captured image has a rank of 1280 in a width direction and a rank of 960 in the height direction. The image having the compression ratio of the characteristics amount at 95% has a rank of 569 in the width direction and a rank of 494 in the height direction. The image having the compression ratio of the characteristics amount at 90% has a rank of 371 in the width direction and a rank of 333 in the height direction. The image having the compression ratio of the characteristics amount at 80% has a rank of 202 in the width direction and a rank of 186 in the height direction. The image having the compression ratio of the characteristics amount at 75% has a rank of 156 in the width direction and a rank of 145 in the height direction. The image having the compression ratio of the characteristics amount at 70% has a rank of 122 in the width direction and a rank of 114 in the height direction. The image having the compression ratio of the characteristics amount at 60% has a rank of 73 in the width direction and a rank of 69 in the height direction. The image having the compression ratio of the characteristics amount at 50% has a rank of 41 in the width direction and a rank of 38 in the height direction.

As illustrated in FIG. 3A and FIG. 3B, performing the low-rank approximation by the singular value decomposition causes images to be rough in less characteristic portions including, for example, the sky or a hood of a vehicle, comparing with the original captured image. On the other hand, characteristic portions such as an edge of the vehicle, and characters and lines drawn on a road surface can be recognized in the image subjected to the low-rank approximation by the singular value decomposition. Thus, it can be seen that, even when the captured image is subjected to the low-rank approximation by the singular value decomposition and the ranks thereof are reduced by a fraction to a few tenths, compression is performed for less characteristic portions while the characteristic portions necessary for the object recognition are maintained. As a result, a decrease in the accuracy of the object recognition can be suppressed and, because of the sparsity of the matrix corresponding to the image subjected to the low-rank approximation by the singular value decomposition, the processing load can be reduced and the object recognition can be sped up.

Next, an example result of the object recognition using an image subjected to the low-rank approximation by the singular value decomposition will be described.

FIG. 4A to FIG. 4F are diagrams illustrating an example result of the object recognition using captured images capturing a vehicle located behind and images obtained by subjecting the captured images to the low-rank approximation by the singular value decomposition. FIG. 4A to FIG. 4F illustrate the example in which the amount of information is compressed to 80% of that of the original captured image by performing the low-rank approximation by Tucker Decomposition/Higher Order Singular Value Decomposition. The original captured image has a rank of 1280 in the width direction and a rank of 960 in the height direction.

FIG. 4A illustrates an original captured image in which a vehicle is located behind at a distance of 17 m and an image that is obtained by performing the low-rank approximation by the singular value decomposition on the captured image and has a compression ratio of an characteristics amount at 80%. The image having the compression ratio of the characteristics amount at 80% has a rank of 181 in the width direction and a rank of 163 in the height direction.

FIG. 4B illustrates an original captured image in which a vehicle is located behind at a distance of 12 m and an image that is obtained by performing the low-rank approximation by the singular value decomposition on the captured image and has a compression ratio of a characteristics amount at 80%. The image having the compression ratio of the characteristics amount at 80% has a rank of 180 in the width direction and a rank of 162 in the height direction.

FIG. 4C illustrates an original captured image in which a vehicle is located behind at a distance of 8 m and an image that is obtained by performing the low-rank approximation by the singular value decomposition on the captured image and has a compression ratio of a characteristics amount at 80%. The image having the compression ratio of the characteristics amount at 80% has a rank of 179 in the width direction and a rank of 161 in the height direction.

FIG. 4D illustrates an original captured image in which a vehicle is located behind at a distance of 5 m and an image that is obtained by performing the low-rank approximation by the singular value decomposition on the captured image and has a compression ratio of a characteristics amount at 80%. The image having the compression ratio of the characteristics amount at 80% has a rank of 178 in the width direction and a rank of 159 in the height direction.

FIG. 4E illustrates an original captured image in which a vehicle is located behind at a distance of 3 m and an image that is obtained by performing the low-rank approximation by the singular value decomposition on the captured image and has a compression ratio of a characteristics amount at 80%. The image having the compression ratio of the characteristics amount at 80% has a rank of 175 in the width direction and a rank of 157 in the height direction.

FIG. 4F illustrates an original captured image in which a vehicle is located behind at a distance of 1 m and an image that is obtained by performing the low-rank approximation by the singular value decomposition on the captured image and has a compression ratio of a characteristics amount at 80%. The image having the compression ratio of the characteristics amount at 80% has a rank of 174 in the width direction and a rank of 158 in the height direction.

FIG. 5A to FIG. 5F are diagrams illustrating an example result of the object recognition using actual captured images capturing a person located behind and images obtained by subjecting the captured images to the low-rank approximation by the singular value decomposition. FIG. 5A to FIG. 5F illustrate the example in which the amount of information is compressed to 80% of that of the original captured image by performing the low-rank approximation by Tucker Decomposition/Higher Order Singular Value Decomposition. The original captured image has a rank of 1280 in the width direction and a rank of 960 in the height direction.

FIG. 5A illustrates an original captured image in which a person is located behind at a distance of 17 m and an image that is obtained by performing the low-rank approximation by the singular value decomposition on the captured image and has a compression ratio of a characteristics amount at 80%. The image having the compression ratio of the characteristics amount at 80% has a rank of 187 in the width direction and a rank of 168 in the height direction.

FIG. 5B illustrates an original captured image in which a person is located behind at a distance of 12 m and an image that is obtained by performing the low-rank approximation by the singular value decomposition on the captured image and has a compression ratio of a characteristics amount at 80%. The image having the compression ratio of the characteristics amount at 80% has a rank of 185 in the width direction and a rank of 167 in the height direction.

FIG. 5C illustrates an original captured image in which a person is located behind at a distance of 8 m and an image that is obtained by performing the low-rank approximation by the singular value decomposition on the captured image and has a compression ratio of a characteristics amount at 80%. The image having the compression ratio of the characteristics amount at 80% has a rank of 185 in the width direction and a rank of 167 in the height direction.

FIG. 5D illustrates an original captured image in which a person is located behind at a distance of 5 m and an image that is obtained by performing the low-rank approximation by the singular value decomposition on the captured image and has a compression ratio of a characteristics amount at 80%. The image having the compression ratio of the characteristics amount at 80% has a rank of 183 in the width direction and a rank of 164 in the height direction.

FIG. 5E illustrates an original captured image in which a person is located behind at a distance of 3 m and an image that is obtained by performing the low-rank approximation by the singular value decomposition on the captured image and has a compression ratio of a characteristics amount at 80%. The image having the compression ratio of the characteristics amount at 80% has a rank of 186 in the width direction and a rank of 167 in the height direction.

FIG. 5F illustrates an original captured image in which a person is located behind at a distance of 1 m and an image that is obtained by performing the low-rank approximation by the singular value decomposition on the captured image and has a compression ratio of a characteristics amount at 80%. The image having the compression ratio of the characteristics amount at 80% has a rank of 194 in the width direction and a rank of 174 in the height direction.

As illustrated in FIG. 4A to FIG. 4F and FIG. 5 to FIG. 5F, in the case in which a target of the object recognition is a vehicle and in the case in which a target of the object recognition is a person, when the ranks in the width direction and in the height direction are reduced to approximately 15% by performing the low-rank approximation by the singular value decomposition, the accuracy of the object recognition similar to that of a case using the original captured images was obtained.

Here, conceptually speaking, a matrix corresponding to the original captured image is a three-dimensional matrix in size of W (width): 1280×H (height): 960×C (color): 3 (R, G, B) in which a value is assigned to each element. On the other hand, conceptually speaking, a matrix corresponding to the image in which the compression ratio of the characteristics amount is 80% as illustrated in FIG. 4A to FIG. 4F and FIG.

5 to FIG. 5F is a sparse matrix having the same size as the matrix corresponding to the original captured image, in which elements W: 180×H: 160×C: 3 alone have values while the other elements are 0. In performing the image recognition using an image corresponding to such a sparse matrix, calculation for obvious results such as multiplying by 0 or adding 0 can be omitted, whereby the processing load of the object recognition can be reduced. Further, because less characteristics portions including the sky or the hood of the vehicle are preferentially compressed as illustrated in FIG. 4A to FIG. 4F and FIG. 5 to FIG. 5F, a decrease in the accuracy of the object recognition can be suppressed.

Next, an image processing method of the image processing apparatus 10 according to the present embodiment will be described with reference to a flowchart illustrated in FIG. 6. The image processing apparatus 10 repeats the flow illustrated in FIG. 6 at, for example, predetermined time intervals.

The interface 12 acquires the image captured by the imaging unit 11 (step S11).

The processor 13 performs the low-rank approximation by the singular value decomposition on the acquired image acquired by the interface 12 (step S12).

Subsequently, the processor 13 performs the object recognition on the image subjected to the low-rank approximation by the singular value decomposition (step S13).

By using the image subjected to the low-rank approximation by the singular value decomposition, the processor 13 can also perform image analysis such as detection of a region having a large or small characteristics amount in the image. Because the characteristics amount of an asphalt road surface having a fine pattern is maintained in the image subjected to the low-rank approximation by the singular value decomposition, the processor 13 can detect the asphalt road surface on which the mobile body 1 is progressing. The processor 13 can also detect areas other than the asphalt road surface, such as a water surface, a lake surface, lawn, farms, or the like.

Also, in the image subjected to the low-rank approximation by the singular value decomposition, a wall surface in an irradiation direction of strong light such as sunlight or outdoor illumination light has a small characteristics amount and is preferentially compressed by the low-rank approximation. Thus, the processor 13 can also detect the sunlight, the irradiation direction of light, and the like. Further, the processor 13 can detect a moving object and a stationary object by increasing a dimension of a matrix and performing batch processing on a still image cut out from a video image.

As described above, the image processing apparatus 10 according to the present embodiment includes the interface 12 configured to acquire an image and the processor 13 configured to perform the low-rank approximation by the singular value decomposition on the acquired image and perform the object recognition on the image subjected to the low-rank approximation by the singular value decomposition.

By performing the low-rank approximation on the acquired image, more elements become zero in the matrix corresponding to the image subjected to the low-rank approximation by the singular value decomposition. Because calculations for obvious results such as multiplying by 0 or adding 0 can be omitted, the processing load of the object recognition can be reduced. Further, in the low-rank approximation by the singular value decomposition, less characteristic portions are preferentially compressed while characteristics portions remain, whereby a decrease in the accuracy of the object recognition can be suppressed.

Although the present disclosure has been described based on the figures and the embodiments, it should be appreciated that those who are skilled in the art may easily perform variations or alteration based on the present disclosure. Accordingly, such variations and alterations are to be included in the scope of the present disclosure.

The invention claimed is:

1. An image processing apparatus comprising:
a processor configured to
perform low-rank approximation by singular value decomposition on an acquired image acquired by an imaging unit, and perform object recognition on the acquired image subjected to the low-rank approximation by the singular value decomposition;
perform the singular value decomposition to decompose a matrix corresponding to the acquired image into a left singular value matrix, a first diagonal matrix, and a right singular value matrix, wherein the acquired image subjected to the low-rank approximation by the singular value decomposition corresponds to a matrix obtained by an inner product of a second diagonal matrix obtained by reducing a rank of the first diagonal matrix and the right singular value matrix; and
determine a rank of the second diagonal matrix according to a desired characteristics amount in the acquired image subjected to the low-rank approximation by the singular value decomposition.

2. The image processing apparatus according to claim 1, wherein the processor is configured to vary the desired characteristics amount depending on an area of the acquired image.

3. The image processing apparatus according to claim 1, wherein the acquired image is captured by a camera mounted on a mobile body, and
the processor is configured to vary the desired characteristics amount according to a behavior of the mobile body.

4. The image processing apparatus according to claim 1, wherein the processor is configured to perform object recognition by inputting the acquired image subjected to the low-rank approximation by the singular value decomposition to a model generated by learning.

5. The image processing apparatus according to claim 4, wherein learning data used for learning the model is an image that is not subjected to the low-rank approximation by the singular value decomposition.

6. A camera comprising:
an imaging optical system;
an image sensor configured to capture an image formed via the imaging optical system; and
a processor configured to
perform low-rank approximation by singular value decomposition on the image captured by the image sensor, and perform object recognition on the image subjected to the low-rank approximation by the singular value decomposition;
perform the singular value decomposition to decompose a matrix corresponding to the image into a left singular value matrix, a first diagonal matrix, and a right singular value matrix, wherein the image subjected to the low-rank approximation by the singular value decomposition corresponds to a matrix obtained by an inner product of a second diagonal matrix obtained by reducing a rank of the first diagonal matrix and the right singular value matrix; and determine a rank of the second diagonal matrix according to a desired characteristics amount in the image subjected to the low-rank approximation by the singular value decomposition.

7. A mobile body comprising the camera according to claim 6, wherein the camera is configured to capture an image of surroundings of the mobile body.

8. An image processing method for an image processing apparatus, the image processing method comprising:
acquiring an image;
performing low-rank approximation by singular value decomposition on the acquired image, and performing object recognition on the acquired image subjected to the low-rank approximation by the singular value decomposition;
performing the singular value decomposition to decompose a matrix corresponding to the acquired image into a left singular value matrix, a first diagonal matrix, and a right singular value matrix, wherein the acquired image subjected to the low-rank approximation by the singular value decomposition corresponds to a matrix obtained by an inner product of a second diagonal matrix obtained by reducing a rank of the first diagonal matrix and the right singular value matrix; and
determining a rank of the second diagonal matrix according to a desired characteristics amount in the acquired image subjected to the low-rank approximation by the singular value decomposition.

\* \* \* \* \*